US012789531B2

(12) United States Patent
Nishiwaki et al.

(10) Patent No.: US 12,789,531 B2
(45) Date of Patent: Nov. 10, 2026

(54) INK JET RECORDING METHOD AND INK JET RECORDING APPARATUS

(71) Applicant: CANON KABUSHIKI KAISHA, Tokyo (JP)

(72) Inventors: Yuko Nishiwaki, Tokyo (JP); Soichi Nagai, Kanagawa (JP); Atsuhito Yoshizawa, Tokyo (JP); Eriko Yoshino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 18/670,925

(22) Filed: May 22, 2024

(65) Prior Publication Data

US 2024/0399753 A1 Dec. 5, 2024

(30) Foreign Application Priority Data

Jun. 5, 2023 (JP) ................................ 2023-092624
Apr. 25, 2024 (JP) ................................ 2024-071534

(51) Int. Cl.
*C09D 11/322* (2014.01)
*B41J 2/175* (2006.01)
*C09D 11/324* (2014.01)

(52) U.S. Cl.
CPC ......... *B41J 2/17523* (2013.01); *C09D 11/322* (2013.01); *C09D 11/324* (2013.01)

(58) Field of Classification Search
CPC ............... B41J 2/17523; C09D 11/322; C09D 11/324
See application file for complete search history.

(56) References Cited

U.S. PATENT DOCUMENTS 6,471,757 B1 10/2002 Koitabashi et al.
6,547,382 B1 * 4/2003 Shirota .................. C09D 11/30 347/100
8,188,179 B2 5/2012 Nishiwaki et al.
(Continued)

FOREIGN PATENT DOCUMENTS

CN 106240157 A 12/2016
CN 114619762 A 6/2022
(Continued)

OTHER PUBLICATIONS

Chinese Office Action issued in corresponding Chinese Application No. 202410708769.2 dated May 28, 2026.

*Primary Examiner* — Jason S Uhlenhake
(74) *Attorney, Agent, or Firm* — Venable LLP

(57) ABSTRACT

An ink jet recording method is provided that can record high quality images over a long period of time while suppressing a decrease in optical density at the edge of a black image adjacent to a color image, even in the case where an ink jet recording apparatus having a large capacity ink storage portion having an openable and closable ink inlet port is used. The method is an ink jet recording method including, using an ink jet recording apparatus having a first ink storage portion, a second ink storage portion and a recording head that ejects an aqueous ink, recording an image. The aqueous ink includes a black ink, and a color ink containing an organic pigment, and the content $P_1$ of the carbon black in the black ink and the content $P_2$ of the organic pigment in the color ink satisfy $P_1 \leq P_2$.

12 Claims, 2 Drawing Sheets

(56) References Cited

U.S. PATENT DOCUMENTS

| | | | |
|---|---|---|---|
| 8,408,691 | B2 | 4/2013 | Koike et al. |
| 8,425,027 | B2 | 4/2013 | Nishiwaki et al. |
| 8,491,715 | B2 | 7/2013 | Gouda et al. |
| 8,987,348 | B2 | 3/2015 | Mukae et al. |
| 9,789,698 | B2 | 10/2017 | Nagai et al. |
| 9,994,012 | B2 | 6/2018 | Negishi et al. |
| 10,233,343 | B2 | 3/2019 | Takebayashi et al. |
| 10,688,787 | B2 | 6/2020 | Kaji et al. |
| 11,827,034 | B2 | 11/2023 | Kusada et al. |
| 12,005,726 | B2 | 6/2024 | Nakata et al. |
| 2016/0355019 | A1 | 12/2016 | Negishi et al. |
| 2020/0410311 | A1* | 12/2020 | Koganehira ......... B41J 2/17509 |
| 2022/0242155 | A1 | 8/2022 | Tajima et al. |
| 2023/0158809 | A1 | 5/2023 | Yoshida et al. |

FOREIGN PATENT DOCUMENTS

| | | | |
|---|---|---|---|
| JP | 2004075820 | A | 3/2004 |
| JP | 2006182943 | A | 7/2006 |
| JP | 2008284874 | A | 11/2008 |
| JP | 2016-147984 | A | 8/2016 |
| JP | 2017-001391 | A | 1/2017 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, with the increase in remote work at home, there has been a demand for ink jet recording apparatuses to be capable of recording images with excellent color developability on recording media such as plain paper with high productivity, for example. For example, aqueous pigmented inks containing pigments as coloring materials have been widely used to record images with excellent color developability. In particular, black inks containing carbon blacks as coloring materials and color inks containing color organic pigments as coloring materials have been generally used.

Replaceable tanks have been known, in which the ink tank is replaced when the remaining amount of ink stored in the ink tank is reduced. To realize high productivity, ink jet recording apparatuses have been proposed that have, a large capacity main tank as the ink storage portion. For such a large capacity main tank, tanks with a system in which the ink is injected when the remaining amount of ink is reduced have been investigated, rather than replaceable tanks as used in Japanese Patent Application Laid-Open No. 2016-147984. For example, an ink jet recording apparatus is proposed that can apply a pigmented ink and that has an ink injectable main tank (Japanese Patent Application Laid-Open No. 2017-001391).

For the ink injectable main tank, a system in which the ink is injected from an ink bottle is adopted, for example. That is, an openable and closable ink inlet port is provided in the main tank, allowing the timing and amount of ink to be injected to be adjusted as appropriate.

The present inventors used an ink jet recording apparatus equipped with an ink injectable tank, as proposed in Japanese Patent Application Laid-Open No. 2017-001391, to apply a black ink containing a carbon black and a color ink containing an organic pigment to a recording medium and record images over a long period of time. As a result, it was found that, at the boundary between black and color images recorded with the black and color inks applied adjacent to each other, the optical density of the edge of the black image may be decreased. Furthermore, it was found that, after recording images over a long period of time, the decrease in optical density at the edge of the black image was more remarkable.

Accordingly, an object of the present invention is to solve the problems that arise when recording images using an ink jet recording apparatus having a large capacity ink storage portion having an openable and closable ink inlet port. That is, an object of the present invention is to provide an ink jet recording method that can record high quality images over a long period of time while suppressing a decrease in optical density at the edge of a black image adjacent to a color image, even in the case where such an ink jet recording apparatus is used. In addition, another object of the present invention is to provide an ink jet recording apparatus for use in this ink jet recording method.

SUMMARY OF THE INVENTION

That is, according to the present invention, there is provided an ink jet recording method including, using an ink jet recording apparatus having: a first ink storage portion that has an openable and closable ink inlet port and that is refillable with an aqueous ink from the ink inlet port; a second ink storage portion that is connected to the first ink storage portion via a tube and that stores the aqueous ink; and a recording head that is connected to the second ink storage portion and that has an ejection orifice formed to eject the aqueous ink supplied from the second ink storage portion, recording an image by applying the aqueous ink ejected from the ejection orifice to a recording medium, in which the aqueous ink includes a black ink containing a carbon black and an acrylic resin particle, and a color ink containing an organic pigment, and the content $P_1$ (% by mass) of the carbon black in the black ink and the content $P_2$ (% by mass) of the organic pigment in the color ink satisfy the relationship of the following expression (1):

$$P_1 \leq P_2. \qquad (1)$$

According to the present invention, the problems can be solved that arise when recording images using an ink jet recording apparatus having a large capacity ink storage portion having an openable and closable ink inlet port. That is, an ink jet recording method can be provided that can record high quality images over a long period of time while suppressing a decrease in optical density at the edge of a black image adjacent to a color image, even in the case where such an ink jet recording apparatus is used. In addition, according to the present invention, an ink jet recording apparatus can be provided for use in this ink jet recording method.

Further features of the present invention will become apparent from the following description of exemplary embodiments with reference to the attached drawings.

DESCRIPTION OF THE EMBODIMENTS

Figure 1:
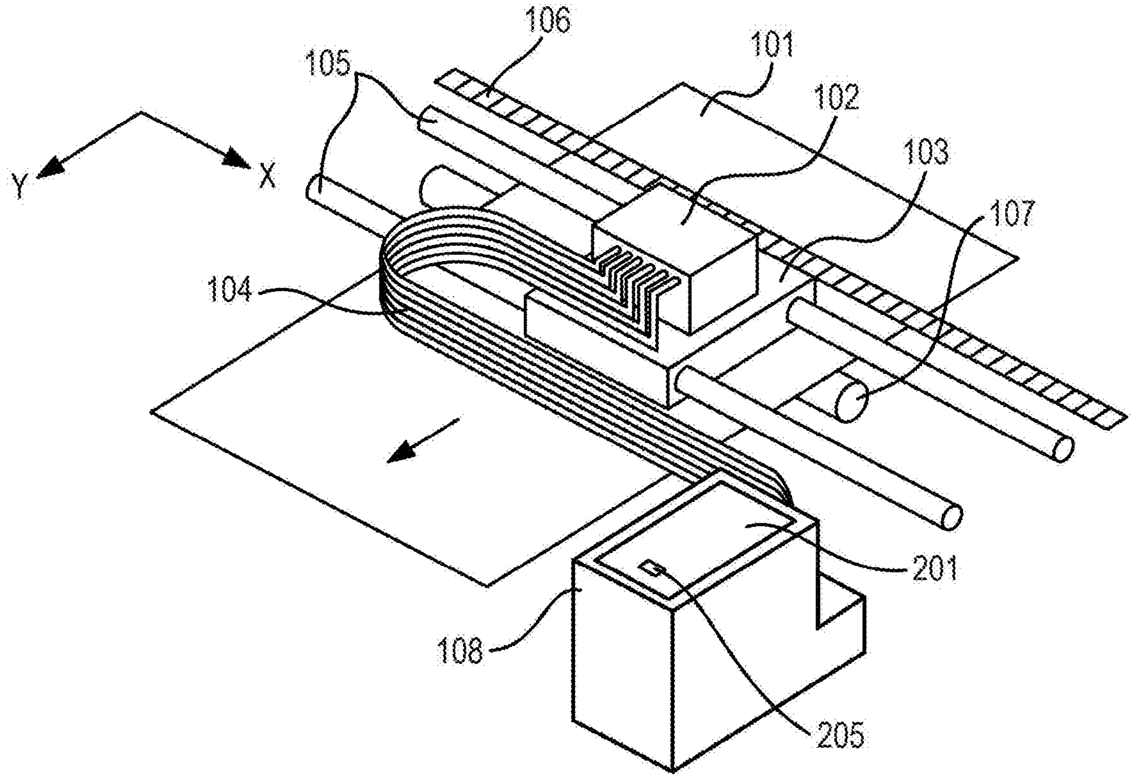
FIG. 1 is a perspective view schematically illustrating one embodiment of the ink jet recording apparatus of the present invention.

Preferred embodiments of the present invention will now be described in detail in accordance with the accompanying drawings.

Hereinafter, the present invention will be described in further detail with reference to preferred embodiments. In the present invention, in the case where a compound is a salt, the salt is dissociated into ions in the ink, but is described as "salt is contained" for the sake of convenience. Also, an aqueous ink for ink jet may be described simply as "ink". Physical property values are those at normal temperature (25° C.), unless otherwise noted.

The present inventors first prepared a black ink that contains a carbon black but does not contain an acrylic resin particle, a color ink that contains an organic pigment, and an ink jet recording apparatus having a first ink storage portion (main tank) having an openable and closable ink inlet port. Then, using this ink jet recording apparatus, the black and color inks were ejected, and the optical density at the boundary between black and color images recorded adjacent to each other was observed. As a result, it was found that bleeding occurred at the edge on the black image side of the boundary, resulting in a lighter black color than it should have been. Thereafter, when a black ink containing a larger amount of pigment compared to the color ink was used, it was found that the phenomenon of lighter black color at the edge of the black image was less likely to occur.

Ink jet recording apparatuses having a first ink storage portion (main tank) and a second ink storage portion (sub tank) can easily increase the overall capacity of the ink storage portion compared to ink jet recording apparatuses having an ink storage portion (ink cartridge) on the carriage. Also, in the case where apparatuses equipped with a main tank having an openable and closable ink inlet port are used, the timing and amount of ink to be injected can be adjusted as appropriate, minimizing concerns about running out of ink in the middle of recording and increasing productivity. However, ink jet recording apparatuses having a large capacity main tank having an openable and closable inlet port are used over a long period of time while refilling the ink from a bottle or the like. For this reason, pigments tend to settle in the main tank and the pigment concentration in the ink tends to gradually increase, especially in the lower part of the tank.

Small ink jet recording apparatuses used in offices and homes are often used to record web pages, text, and the like, and the amount of black ink used is likely to be larger than of color ink. For this reason, the main tank for black ink is often made larger than the main tank for color ink. However, due to a limitation of an apparatus size, it is difficult to enlarge the main tank for black ink to the extent that the refilling frequency of black ink and color ink is almost equal. Therefore, inevitably, the injection frequency of black ink is likely to be higher than that of color ink. In other words, black ink is frequently injected from the inlet port of the main tank, making it difficult for pigment settlement to occur. On the other hand, the injection frequency of color ink is low, which leads to pigment settlement, and the pigment concentration in the ink is likely to increase in the lower part of the main tank. Under such circumstances, when an ink jet recording apparatus is used to record images over a long period of time, the pigment concentration in the ink increases more and more at the lower part of the main tank for color ink. When an image in which black and color images are adjacent to each other is recorded in such a state, it was found that a phenomenon occurs in which bleeding occurs at the edge on the black image side of the boundary, resulting in a lighter black color than it should be and a decrease in optical density. This is a new problem that arises from the use of an ink jet recording apparatus having a first ink storage portion (main tank) and a second ink storage portion (sub tank) to perform recording over a long period of time.

This problem can be said to arise because the degree of pigment settlement differs greatly between black ink and color ink in the case where an ink jet recording apparatus having an ink inlet port in the main tank is used over a long period of time. If the pigment content in the black ink has been increased in advance to exceed the range of increase in pigment concentration of the color ink in the lower part of the main tank, which occurs during this period, the phenomenon that the optical density at the edge of the black image decreases can be made less likely to occur. However, in the case of using a black ink in which the pigment content has been increased in advance, the pigment is likely to stick to the recording head when the ink jet recording apparatus is not in use, making it difficult to eject the ink normally. In particular, carbon black, which is a coloring material for black ink, has a shape in which primary particles are sterically connected to form secondary particles (so-called "structure"), unlike an organic pigment, which is a coloring material for a color ink, and have a relatively large specific surface area, making them more susceptible to agglomeration than organic pigments.

Accordingly, when the pigment content in the black ink is simply increased to suppress the phenomenon that the optical density at the edge of the black image decreases, pigment adhesion in the recording head may easily occur, making it difficult to take this approach.

As a result of investigations, the present inventors have found that adopting the following configuration can suppress the decrease in optical density at the edge of a black image adjacent to a color image, even in the case where an ink jet recording apparatus having a main tank having an openable and closable ink inlet port is used. That is, they have found that it is effective to add an acrylic resin particle to a black ink and also to make the content $P_1$ (% by mass) of a carbon black in the black ink and the content $P_2$ (% by mass) of an organic pigment in a color ink satisfy the relationship of the following expression (1):

$$P_1 \leq P_2. \quad (1)$$

The present inventors performed detailed observations of images recorded with a black ink that contains a carbon black but does not contain an acrylic resin particle, and images recorded with a black ink that contains a carbon black and an acrylic resin particle, immediately after recording. Specifically, after the liquid component had almost penetrated the recording medium, agglomerates of the carbon black only and agglomerates formed of the carbon black and the acrylic resin particle were each observed and compared. As a result, it was found that the agglomerates of the carbon black only had more liquid component retained in the agglomerates and higher degree of wetting compared to the agglomerates formed of the carbon black and the acrylic resin particle. As mentioned above, unlike organic pigments, carbon blacks have structure. The evaporation of water and the penetration of liquid component into the recording medium causes the carbon black particles with structure to agglomerate with each other, and more bulky agglomerates are formed on the recording medium. When such bulky agglomerates are formed, it is presumed that the degree of wetting is increased due to the liquid component remaining in the bulky agglomerates even after the liquid component has almost penetrated the recording medium. When images are recorded so that the black ink that forms such agglomerates and the color ink are adjacent to each other, the color ink is thought to bleed into the black ink, resulting in a decrease in optical density at the edge of the black image.

In contrast, in the case of using a black ink that contains a carbon black and an acrylic resin particle, the acrylic resin particle also agglomerates together with the carbon black to form agglomerates on the recording medium. As previously mentioned, carbon blacks have structure, but when they agglomerate together with a spherical acrylic resin particle, the acrylic resin particle is thought to be inserted between the bulky carbon blacks, forming agglomerates with mitigated bulkiness. The mitigated bulkiness of agglomerates makes it difficult for the agglomerates to retain the liquid component, and the penetration speed of the liquid component into the recording medium is also increased compared to agglomerates formed of carbon black only. Because of the reason as described above, the use of a black ink to which an acrylic resin particle is added is thought to suppress the decrease in optical density at the edge of a black image adjacent to a color image.

<Ink Jet Recording Method and Ink Jet Recording Apparatus>

The ink jet recording method of the present invention is a recording method using an ink jet recording apparatus having a first ink storage portion, a second ink storage portion and a recording head. The first ink storage portion is a member that has an openable and closable ink inlet port and that is refillable with an ink from the ink inlet port. The second ink storage portion is a member that is connected to the first ink storage portion via a tube and that stores the ink. The recording head is a member that is connected to the second ink storage portion and that has an ejection orifice formed to eject the ink supplied from the second ink storage portion. The ink jet recording method of the present invention includes a step of recording an image by applying the ink ejected from the ejection orifice of the recording head to a recording medium. The ink includes a black ink containing a carbon black and an acrylic resin particle, and a color ink containing an organic pigment. The content $P_1$ (% by mass) of the carbon black in the black ink and the content $P_2$ (% by mass) of the organic pigment in the color ink satisfy the relationship of the following expression (1):

$$P_1 \leq P_2. \tag{1}$$

Also, the ink jet recording apparatus of the present invention has a first ink storage portion, a second ink storage portion and a recording head. The first ink storage portion is a member that has an openable and closable ink inlet port and that is refillable with an ink from the ink inlet port. The second ink storage portion is a member that is connected to the first ink storage portion via a tube and that stores the ink. The recording head is a member that is connected to the second ink storage portion and that has an ejection orifice formed to eject the ink supplied from the second ink storage portion. The ink includes a black ink containing a carbon black and an acrylic resin particle, and a color ink containing an organic pigment. The content $P_1$ (% by mass) of the carbon black in the black ink and the content $P_2$ (% by mass) of the organic pigment in the color ink satisfy the relationship of the following expression (1):

$$P_1 \leq P_2. \tag{1}$$

(Ink Jet Recording Apparatus)

FIG. 1 is a perspective view schematically illustrating one embodiment of the ink jet recording apparatus of the present invention. The ink jet recording apparatus of the present embodiment is a so-called serial ink jet recording apparatus that performs recording operations by moving the recording head back and forth for scanning in the X direction (main scanning direction). A recording medium 101 is intermittently conveyed in the Y direction (sub scanning direction) by a conveyance roller 107. A recording unit 102 mounted on a carriage 103 is moved back and forth for scanning in the X direction (main scanning direction), which is orthogonal to the Y direction, the direction in which the recording medium 101 is conveyed. The recording operations are performed by conveying the recording medium 101 in the Y direction and by moving the recording unit 102 back and forth for scanning in the X direction. The recording unit 102 is constituted by an ink jet type recording head 203 (FIG. 2), which ejects from an ejection orifice the ink supplied, and a sub tank 202 (FIG. 2) as the second ink storage portion, and is mounted on the carriage 103. The carriage 103 is movably supported along guide rails 105 arranged along the X direction, and is fixed to an endless belt 106 that moves parallel to the guide rails 105. The endless belt 106 is moved back and forth by the driving force of a motor, which causes the carriage 103 to be moved back and forth for scanning in the X direction.

Inside a main tank storage portion 108, a main tank 201 as the first ink storage portion is stored. The main tank 201 in the main tank storage portion 108 is connected to the sub tank 202 in the recording unit 102 by an ink supply tube 104, which is the ink supply path. The ink is supplied from the main tank 201 to the sub tank 202 (FIG. 2) via the ink supply tube 104, and then ejected from the ejection orifice of the recording head 203. The main tank 201, the ink supply tube 104, and the sub tank 202 can all be provided in numbers corresponding to the type of ink. The main tank 201 and the sub tank 202 are preferably connected by the ink supply tube 104, not via any other ink storage portion.

At the top of the main tank 201, an ink inlet port 205 is provided for injecting the ink into the main tank 201 from outside of the ink jet recording apparatus. When the ink jet recording apparatus is used for the first time, or when the amount of ink in the main tank is reduced, the ink is injected from an ink bottle into the main tank, which is installed inside the ink jet recording apparatus. In other words, the main tank is kept inside the ink jet recording apparatus and is not replaced by itself.

Figure 2:
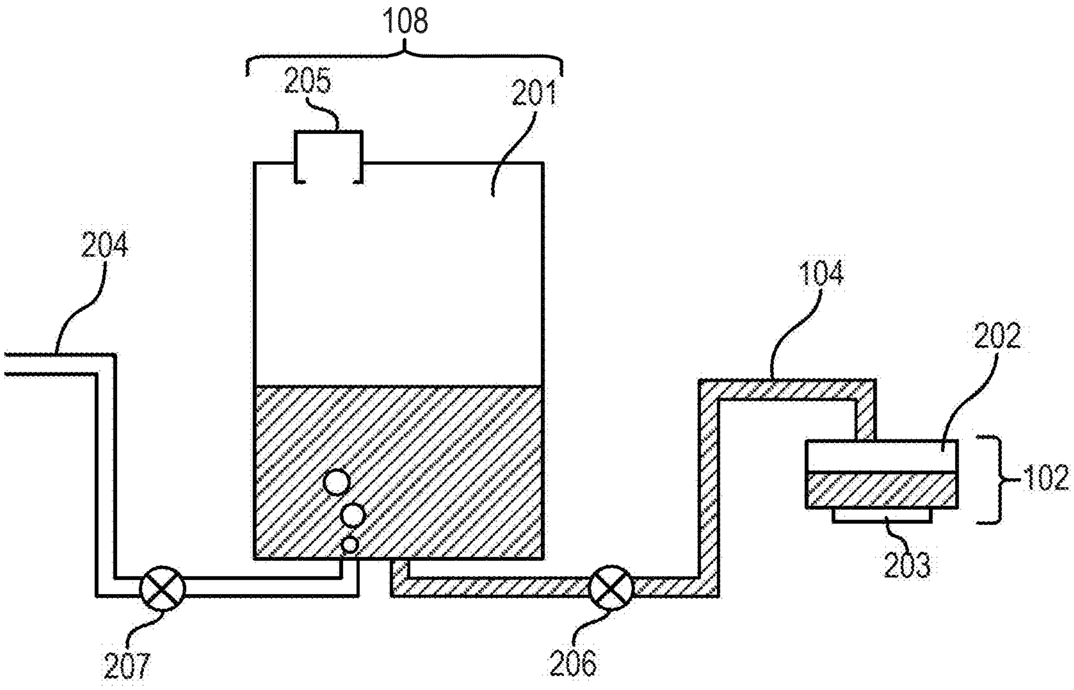
FIG. 2 is a schematic diagram illustrating an example of an ink supply system.

FIG. 2 is a schematic diagram illustrating an example of an ink supply system. The ink (illustrated by hatching) stored in the main tank 201 is supplied to the sub tank 202 via the ink supply tube 104, and then supplied to the recording head 203. To the main tank 201, a gas introducing tube 204 as an atmosphere communicating section is connected. As recording is performed and the ink is consumed, the ink is supplied from the main tank 201 to the sub tank 202, and the ink in the main tank 201 is reduced. Then, air is introduced into the main tank 201 from the gas introducing tube 204, one end of which is open to the atmosphere, thereby keeping the internal negative pressure for retaining ink at a generally constant level in the ink supply system.

It is preferable for the main tank 201 to have a larger maximum ink capacity V1 (mL) in order to realize high productivity by increasing the number of sheets that can be recorded. Specifically, the maximum ink capacity V1 (mL) of the main tank 201 is preferably 100 mL or more to 300 mL or less, and still more preferably 100 mL or more to 200 mL or less. Also, the initial ink filling volume of the main tank 201 is preferably up to about 95% based on the maximum ink capacity.

In order to reduce the frequency of ink supply from the main tank 201 and to ensure stable ink supply to the recording head 203, it is preferable for the sub tank 202 to also have a larger maximum ink capacity V2 (mL). However, for example, assuming a form in which the sub tank 202 is mounted on the carriage 103 as the serial system as illustrated in FIG. 1, it is preferable for the maximum ink capacity V2 (mL) of the sub tank 202 not to be too large. That is, too much ink stored in the sub tank 202 leads to a larger size of the recording unit 102, which decreases the moving speed of the carriage 103 and requires the strength of the endless belt 106 and motor that move the carriage 103 to be enhanced. Accordingly, the maximum ink capacity V2 (mL) of the sub tank 202 is preferably 1 mL or more to 20 mL or less, and still more preferably 2 mL or more to 10 mL or less.

The casings of the main tank 201 and sub tank 202 are formed of a thermoplastic resin such as polyester, polycarbonate, polyethylene, polypropylene, polystyrene, polyphenylene ether, and a mixture or modified product thereof. Inside the casing, an ink absorber that can generate negative pressure for retaining the ink may be disposed. The ink absorber is preferably compressed fibers of polypropylene, polyurethane, or the like. Alternatively, a form may also be used in which the ink absorber is not disposed and the ink is stored directly inside the casing.

The recording unit 102 is constituted by the recording head 203 and the sub tank 202. A form may also be used in which the sub tank 202 is attached to the recording unit 102, which is a head cartridge into which the recording head 203 is incorporated, and the recording unit 102 to which the sub tank 202 is attached is attached to the carriage 103. Furthermore, a form may also be used in which the recording unit 102, integrally constituted by the sub tank 202 and the recording head 203, is attached to the carriage 103. In particular, as illustrated in FIGS. 1 and 2, it is preferable to adopt a form in which the recording unit 102 to which the sub tank 202 is attached is set on the carriage 103.

The ink supply tube 104 is connected to the sub tank 202, which constitutes the recording unit 102 mounted on the carriage 103. For this reason, the ink supply tube 104 is drawn around inside the apparatus following the back and forth scanning of the carriage 103. Accordingly, it is necessary to select and use a material for the ink supply tube 104 that is flexible enough to withstand the frequent back and forth scanning of the carriage 103. For this reason, the ink supply tube 104 is formed of a resin material.

In the case where the ink stored in the main tank 201 is reduced, a first valve 206 is activated to close the ink supply tube 104, and then an ink inlet port 205 of the main tank 201 is opened to inject the ink into the main tank 201. If the ink inlet port 205 is opened without activating the first valve 206 and without closing the ink supply tube 104, the negative pressure for retaining the ink is compromised and the ink leaks from the ejection orifice of the recording head 203. Also, when injecting the ink into the main tank 201, the ink inlet port 205 can be opened after activating a second valve 207 to close the gas introducing tube 204. With such a configuration, the ink can be prevented from flowing from the main tank 201 to the direction of the gas introducing tube 204. In addition, leakage of the ink can be more reliably suppressed by activating the first valve 206 and the second valve 207 in conjunction with each other.

The form illustrated in FIG. 2, in which the ink is injected from the top of the main tank 201, provides excellent usability, but since the ink is stored in the main tank 201 over a long period of time, the pigment is likely to settle as time passes. The convection generated by ink injection can cause the ink in the upper part of the main tank to flow, but is not enough to provide mixing to the extent that the pigment that has settled in the lower part is blown up and the gradient in pigment concentration in the ink tank is eliminated. From the viewpoint of suppressing pigment settlement, the main tank may be in the form of a replaceable cartridge. In such a form, even when pigment settlement occurs, problems due to pigment settlement are unlikely to occur since countermeasures can be taken, such as shaking or replacing the cartridge.

Also, large ink jet recording apparatuses, such as those for industrial printing applications, may have a mechanism to prevent ink settlement, as printing stoppages can have a significant impact on output productivity. Examples of the mechanism to prevent settlement may include: a stirring mechanism that stirs the ink in the ink storage portion; an ink circulation mechanism that circulates the ink in a circulation path via the ink flow path; and a supply mechanism that supplies the ink from the top and the bottom of the ink storage portion to allow the ink to flow. In recording apparatuses having such mechanisms, the problems that the present invention is intended to solve do not occur. However, for small ink jet recording apparatuses used in offices and homes, there are high market demands for downsizing of the main body and cost. To cope with these demands, recording apparatuses used in offices and homes usually have no mechanism to prevent settlement, and the ink jet recording apparatus assumed in the present invention does not have such a mechanism to prevent settlement, either.

The ink discharging method of the recording head includes a method in which mechanical energy generated by a piezoelectric element or the like is applied to the ink to eject it, and a method in which thermal energy generated by an electrothermal converter (heater) or the like is applied to the ink to eject it. Either ink discharging method may be adopted.

(Recording Step)

The ink jet recording method of the present invention includes a step of recording an image using the ink jet recording apparatus described above (recording step). In the recording step, specifically, the ink ejected from the ejection orifice of the recording head is applied to a recording medium to record an image. Any recording medium may be used as the subject on which an image is recorded. In particular, it is preferable to use penetrable paper, such as recording media without a coat layer including plain paper and uncoated paper, as well as recording media with a coat layer including glossy paper and art paper. Except for the use of the ink jet recording apparatus mentioned above, the recording step may be any known step.

(Aqueous Ink)

The ink jet recording method of the present invention includes a step of recording an image by applying the ink ejected from the ejection orifice of the recording head to a recording medium. The ink used includes a black ink containing a carbon black and an acrylic resin particle, and a color ink containing an organic pigment. Hereinafter, the components constituting the inks, etc., will be described. Note that, in the case where it is not necessary to distinguish between the black and color inks, they are also collectively referred to simply as “ink”.

[Coloring Material]

As the coloring material for the black ink, a carbon black is used. The carbon black has “structure” in which multiple primary particles are three dimensionally linked to form secondary particles. Since the carbon black forms a bulky pigment layer when agglomerating on the recording medium due to this structure, and exhibits high optical density, the carbon black is suitable as the coloring material for the black ink. Examples of indicators to express the size of carbon black structure may include the DBP oil absorption of the carbon black. A larger DBP oil absorption means a carbon black with larger structure and bulkier frame. Carbon blacks with larger structure tend to increase the degree of wetting of agglomerates, which may slightly decrease the effectiveness of suppressing the decrease in optical density at the edge of the black image, both at the initial stage of recording and after recording over a long period of time. In particular, after recording over a long period of time, the effectiveness of suppressing the decrease in optical density may be more likely to be decreased. For this reason, the DBP oil absorption of the carbon black is preferably 180 mL/100 g or less. The lower limit of the DBP oil absorption of the carbon black is not particularly limited, and is preferably 50 mL/100 g or more, and still more preferably 120 mL/100 g or more.

The carbon black preferably has a BET specific surface area of 350 $m^2$/g or less. A larger BET specific surface area means that the carbon black has smaller primary particles. Carbon blacks with smaller primary particles are more likely to agglomerate rapidly on the recording medium to form more bulky agglomerates. Then, the liquid component contained in the bulky portion does not easily escape and the degree of wetting is increased, which may slightly decrease the effectiveness of suppressing the decrease in optical density at the edge of the black image, both at the initial stage of recording and after recording over a long period of time. The lower limit of the BET specific surface area of the carbon black is not particularly limited, and is preferably 150 $m^2$/g or more.

As the coloring material for the color ink, an organic pigment (hereinafter, also referred to simply as “pigment”) is used. Examples of the organic pigment may include azo pigments, phthalocyanine pigments, quinacridone pigments, isoindolinone pigments, imidazolone pigments, diketopyrrolopyrrole pigments, dioxazine pigments, and perinone pigments. Dyes may be used in combination for purposes such as toning.

The content $P_1$ (% by mass) of the carbon black in the black ink and the content $P_2$ (% by mass) of the organic pigment in the color ink need to satisfy the relationship of the expression (1): $P_1 \leq P_2$. In particular, it is still more preferable to satisfy the relationship of the expression (1'): $P_1 < P_2$. The pigment content (% by mass) in the ink is preferably 0.5% by mass or more to 15.0% by mass or less, still more preferably 1.0% by mass or more to 10.0% by mass or less, and particularly preferably 2.0% by mass or more to 8.0% by mass or less, based on the entire mass of the ink.

Examples of methods for dispersing the pigment may include resin-dispersed pigments using a resin (resin dispersant) as the dispersant, and self-dispersible pigments in which a hydrophilic group is bonded to the particle surface of the pigment. Resin-bonded pigments in which an organic group including a resin is chemically bonded to the particle surface of the pigment, microcapsule pigments in which the surface of the pigment particle is covered with a resin, and the like can also be used.

As the resin dispersant for dispersing the pigment in an aqueous medium, it is preferable to use one that can disperse the pigment in the aqueous medium by the action of an anionic group. As the resin dispersant, the resins mentioned later, in particular water-soluble resins, can be used. In the case of using a resin-dispersed pigment, the pigment content (% by mass) in the ink is preferably 0.2 times or more to 10.0 times or less the content (% by mass) of the resin dispersant in mass ratio.

As the self-dispersible pigment, those having an anionic group such as carboxylic acid group, sulfonic acid group and phosphonic acid group bonded to the particle surface of the pigment directly or via another atomic group (—R—) can be used. The anionic group may be in either acid form or salt form, and if in salt form, may be in either partially dissociated state or fully dissociated state. In the case where the anionic group is in salt form, examples of cations that serve as counter ions may include alkali metal cations, ammonium and organic ammoniums. Specific examples of the other atomic group (—R—) may include: linear or branched alkylene groups having 1 to 12 carbon atoms; arylene groups such as phenylene group and naphthylene group; carbonyl group; imino group; amide group; sulfonyl group; ester group; and ether group. Groups in which these groups are combined may also be used.

The amount $A_{P1}$ (mmol/g) of an anionic group in the carbon black is preferably 0.16 mmol/g or more to 0.80 mmol/g or less, and still more preferably 0.16 mmol/g or more to 0.50 mmol/g or less. While pigment particles such as carbon black are dispersed in an aqueous medium due to the electric charge repulsion of the anionic group, they form agglomerates on a recording medium along with the evaporation of water and the penetration of liquid component into the recording medium. When the amount of the anionic group in the carbon black is less than 0.16 mmol/g, the carbon black is likely to agglomerate rapidly on the recording media and form agglomerates with high degree of wetting in the case of conditions where the pigment concentration in the main tank is likely to be increased. For this reason, after recording over a long period of time, the effectiveness of suppressing the decrease in optical density at the edge of the black image may be slightly decreased. Meanwhile, when the amount of the anionic group in the carbon black is more than 0.80 mmol/g, the affinity with the liquid component is increased, and agglomerates with high degree of wetting are likely to be formed. For this reason, the effectiveness of suppressing the decrease in optical density at the edge of the black image may be slightly decreased, both at the initial stage of recording and after recording over a long period of time.

The amount of the anionic group in the case where the carbon black is a self-dispersible pigment means the amount of the anionic group bonded to the particle surface of the carbon black directly or via another atomic group. Also, the amount of the anionic group in the case where the carbon black is a resin dispersible pigment means the amount of the anionic group in the resin dispersant. For a resin dispersible carbon black, the amount of the anionic group in the carbon black can be adjusted depending on the ratio between the carbon black and the resin dispersant, the acid value of the resin dispersant, and other factors. Also, for a self-dispersible carbon black, it can be adjusted depending on the amount of the anionic group.

The amount of the anionic group in the pigment and in the resin particle mentioned later can both be measured by colloidal titration. In Examples mentioned later, an automatic potentiometric titrator (trade name “AT-510”, manufactured by Kyoto Electronics Manufacturing Co., Ltd.) equipped with a flow potential titration unit (trade name “PCD-500”, manufactured by Kyoto Electronics Manufacturing Co., Ltd.) was used. Then, the amount of the anionic group in the pigment and in the resin particle was measured by colloidal titration utilizing a potential difference, respectively. More specifically, the pigment and the resin particle were each diluted by about 300 times (on a mass basis) with pure water, the pH was then adjusted to about 10 with potassium hydroxide if necessary, and potentiometric titration was performed using 5 mmol/L methylglycol chitosan as the titrant reagent. Of course, the amount of the anionic group can also be measured using the pigment and the resin particle extracted from the ink by a proper method. The measurement conditions and measurement apparatuses are not limited to the above, of course.

For an ink containing, in addition to a water-soluble resin for dispersing the pigment (resin dispersant), a water-soluble resin different from the resin dispersant, the method for confirming the amount of the anionic group in the pigment will be described. The ink is concentrated or diluted to prepare a liquid in which the content of solids (pigment, water soluble resin, resin particle, etc.) is about 10% by mass. For this liquid, centrifugation is performed at 12,000 rpm for 1 hour. This causes separation into a liquid layer containing a water-soluble organic solvent, a resin that does not contribute to dispersion, etc., and a solid layer containing the pigment, the resin that contributes to dispersion thereof, etc., each of which is collected. The water-soluble resin mainly contained in the solid layer containing the pigment is the resin dispersant, and the resin mainly contained in the liquid layer is the water-soluble resin that does not contribute to dispersion of the pigment.

The carbon black in the black ink is preferably a self-dispersible pigment having an anionic group bonded to the particle surface thereof directly or via another atomic group. Compared to self-dispersible carbon blacks, resin dispersible carbon blacks may have higher degree of wetting due to a larger amount of liquid component remaining in the bulky portion of agglomerates to be formed. For this reason, the effectiveness of suppressing the decrease in optical density at the edge of the black image may be slightly decreased, both at the initial stage of recording and after recording over a long period of time. Also, the organic pigment in the color ink is preferably a resin dispersible pigment using a resin (resin dispersant) as the dispersant.

The cumulative 50% particle diameter $D50_{P1}$ in the volume-based particle size distribution of the carbon black and the cumulative 50% particle diameter $D50_{P2}$ in the volume-based particle size distribution of the organic pigment are each preferably 10 nm or more to 300 nm or less. Also, it is still more preferably 20 nm or more to 200 nm or less. The volume average particle diameter of the carbon black and the organic pigment can be measured using a dynamic light scattering particle diameter measuring apparatus. Also, the cumulative 50% particle diameter ($D50_{P2}$) in the volume-based particle size distribution of the organic pigment is preferably larger than the cumulative 50% particle diameter ($D50_{P1}$) in the volume-based particle size distribution of the carbon black. The cumulative 50% particle diameter in the volume-based particle size distribution of the carbon black and the organic pigment can be measured utilizing the same method as the method for determining the resin, mentioned later. The measurement conditions at this time can be the same as those for the method for determining the resin, except that the shape is non-spherical and the refractive index is 1.80 (carbon black) or 1.51 (organic pigment).

[Resin Particle]

The black ink contains an acrylic resin particle, which is a resin particle formed of an acrylic resin. Even when using a resin particle other than the acrylic resin particle, such as wax resin particle, it is difficult for the resin particle to be inserted between the carbon blacks, making it difficult for agglomerates with mitigated bulkiness to be formed. For this reason, the effectiveness of suppressing the decrease in optical density at the edge of the black image cannot be obtained.

The "acrylic resin" as used herein is a resin at least having a unit derived from an acrylic monomer such as (meth) acrylic acid and (meth)acrylate. The water-soluble acrylic resin is preferably a resin having a hydrophilic unit and a hydrophobic unit as the constituent units. Note that "(meth) acrylic" in the following description means "acrylic" and "methacrylic", and "(meth)acrylate" means "acrylate" and "methacrylate".

The "resin particle" as used herein refers to a resin that is not dissolved in the aqueous medium constituting the ink, and specifically means a resin that can be present in the aqueous medium in a state where a particle whose particle diameter can be measured by the dynamic light scattering method is formed. On the other hand, the "water soluble resin" refers to a resin that can be dissolved in the aqueous medium constituting the ink, and specifically means a resin that can be present in the aqueous medium in a state where a particle whose particle diameter can be measured by the dynamic light scattering method is not formed. The "resin particle" can also be replaced with "water dispersible resin (water insoluble resin)".

Whether a certain resin is a "resin particle" or not can be determined according to the following method. First, a liquid containing the resin to be determined (content of resin: 10% by mass) is prepared. Next, the liquid prepared is diluted by 10 times (on a volumetric basis) with ion exchanged water to prepare a sample. Then, if a particle with a particle diameter is measured in the case where the particle diameter of the resin in the sample is measured by the dynamic light scattering method, that particle is determined to be a "resin particle" (water dispersible resin). On the other hand, if no particle with a particle diameter is measured, that resin is determined not to be a "resin particle" (determined to be a "water soluble resin"). The measurement conditions at this time can be, for example, SetZero: 30 seconds, number of measurements: 3 times, measurement time: 180 seconds, shape: true spherical, refractive index: 1.59, and density: 1.0. The measurement conditions are not limited to the above, of course.

The resin particle may be a homopolymer in which a single monomer is polymerized, or may be a copolymer in which two or more monomers are polymerized. Also, the copolymer may be a random copolymer or may be a block copolymer. In particular, resin particles are preferable that are obtained by using a monomer having an anionic group and a monomer not having an anionic group. Examples of the monomer having an anionic group may include α,β-unsaturated carboxylic acids and salts thereof. Examples of the monomer not having an anionic group may include ester compounds of α,β-unsaturated carboxylic acids and α,β-ethylenically unsaturated compounds having an aryl group. Specific examples of these monomers may include monomers that are the same as those mentioned later as the units constituting the resins that can be added to the ink.

The amount $A_{R1}$ (mmol/g) of the anionic group in the acrylic resin particle and the amount $A_{P1}$ (mmol/g) of the anionic group in the carbon black preferably satisfy the relationship of the following expression (4). When the $A_{R1}$ (mmol/g) and the API (mmol/g) satisfy the relationship of the following expression (4), the affinity of the agglomerates formed of the carbon black and the acrylic resin particle with the liquid component is decreased. This is thought to accelerate the flow of the liquid component in the black ink on the recording medium, which can further improve the effectiveness of suppressing the decrease in optical density at the edge of the black image, not only at the initial stage of recording, but also after recording over a long period of time.

$$A_{R1} < A_{P1}. \quad (4)$$

The content (% by mass) of the acrylic resin particle in the black ink is preferably 0.5% by mass or more to 10.0% by mass or less, and still more preferably 0.5% by mass or more to 6.0% by mass or less, based on the entire mass of the black ink. When the content of the acrylic resin particle is less than 0.5% by mass, it may be slightly difficult to mitigate the bulkiness of agglomerates of the carbon black on the recording medium, and the effectiveness of suppressing the decrease in optical density at the edge of the black image may be slightly decreased.

In the black ink, the content $R_1$ (% by mass) of the acrylic resin particle is preferably 0.2 times or more to 1.3 times or less the content $P_1$ (% by mass) of the carbon black in mass ratio. When the above mass ratio is less than 0.2 times, it may be slightly difficult to mitigate the bulkiness of agglomerates of the carbon black on the recording medium. On the other hand, when the above mass ratio is more than 1.3 times, the amount of the acrylic resin particle is relatively excessive, which may weaken the cohesive strength and make it easier for the color ink to bleed into the black ink. Accordingly, when the mass ratio is outside the above range, the effectiveness of suppressing the decrease in optical density at the edge of the black image may be slightly decreased, both at the initial stage of recording and after recording over a long period of time.

The content $P_1$ (% by mass) of the carbon black in the black ink, the content $R_1$ (% by mass) of the acrylic resin particle in the black ink and the content $P_2$ (% by mass) of the organic pigment in the color ink preferably satisfy the relationship of the following expression (2). The $P_1$, $R_1$ and $P_2$ satisfying the relationship of the following expression (2) can further improve the effectiveness of suppressing the decrease in optical density at the edge of the black image, not only at the initial stage of recording, but also after recording over a long period of time.

$$P_2 < (P_1 + R_1). \quad (2)$$

The cumulative 50% particle diameter $D50_{R1}$ (nm) in the volume-based particle size distribution of the acrylic resin particle is preferably 50 nm or more to 300 nm or less from the viewpoint of ejectability of the black ink. When the particle diameter of the acrylic resin particle is smaller than the particle diameter of the carbon black, it may be difficult to mitigate the bulkiness of agglomerates, and the effectiveness of suppressing the decrease in optical density at the edge of the black image may be slightly decreased, both at the initial stage of recording and after recording over a long period of time. The cumulative 50% particle diameter in the volume-based particle size distribution of the acrylic resin particle can be measured by the same method and under the same conditions as the method for determining the resin, previously mentioned.

In the ink storage portion, particles with a larger particle diameter and a larger specific gravity have a larger settlement velocity, and therefore, particles with a smaller specific gravity preferably have a larger particle diameter. The cumulative 50% particle diameter in the volume-based particle size distribution of the carbon black is defined as "$D50_{P1}$ (nm)". Also, the cumulative 50% particle diameter in the volume-based particle size distribution of the organic pigment is defined as "$D50_{P2}$ (nm)". Furthermore, the cumulative 50% particle diameter in the volume-based particle size distribution of the acrylic resin particle is defined as "$D50_{R1}$ (nm)". In this case, the $D50_{P1}$, $D50_{P2}$ and $D50_{R1}$ preferably satisfy the relationship of the following expression (3). This can make the difference in the settlement velocity of the particles in the ink storage portion smaller, and can further improve the effectiveness of suppressing the decrease in optical density at the edge of the black image, not only at the initial stage of recording, but also after recording over a long period of time.

$$D50_{P1} < D50_{P2} < D50_{R1}. \quad (3)$$

[Resin]

The ink can contain a resin. The content (% by mass) of the resin in the ink is preferably 0.1% by mass or more to 20.0% by mass or less, and still more preferably 0.5% by mass or more to 15.0% by mass or less, based on the entire mass of the ink. This "content of the resin" is a value that includes the content of the acrylic resin particle.

The resin can be added to the ink in order to (i) stabilize the dispersion state of the pigment, that is, as the resin dispersant or an auxiliary thereof. The resin can also be added to the ink in order to (ii) improve the various characteristics of the recorded image. Examples of the form of the resin may include block copolymer, random copolymer, graft copolymer, and combinations thereof. Also, the resin may be a water soluble resin that can be dissolved in an aqueous medium.

Examples of the resin may include acrylic resin, polyester resin, urethane resin, urea resin, polysaccharides, and polypeptides. In particular, acrylic resin is preferable from the viewpoint of eject characteristics from the ejection orifice of the recording head. The acrylic resin is preferably one having a unit having an anionic group and a unit not having an anionic group as the constituent units. Examples of the form of the acrylic resin may include random copolymer, block copolymer, graft copolymer, and combinations thereof. As mentioned above, the acrylic resin is a resin at least having a unit derived from an acrylic monomer such as (meth)acrylic acid and (meth)acrylate.

Examples of monomers that become a unit constituting the acrylic resin by polymerization may include monomers having an anionic group and monomers not having an anionic group. Usually, monomers having an anionic group become a hydrophilic unit by polymerization, while monomers not having an anionic group become a hydrophobic unit by polymerization.

Examples of the monomers having an anionic group include α,β-unsaturated carboxylic acids such as (meth) acrylic acid, itaconic acid, maleic acid, and fumaric acid; and anhydrides and salts thereof. Examples of cations constituting salts of α,β-unsaturated carboxylic acids may include lithium cation, sodium cation, potassium cation, ammonium cation, and organic ammonium cations.

Examples of the monomers not having an anionic group may include α,β-ethylenically unsaturated compounds having an aryl group such as styrene, α-methylstyrene, benzyl (meth)acrylate, 2-vinylpyridine, 4-vinylpyridine and 1-vinylimidazole; and ester compounds of α,β-unsaturated carboxylic acids such as ethyl (meth)acrylate, methyl (meth) acrylate, (iso) propyl (meth)acrylate, (n-, iso-, t-)butyl (meth)acrylate, and 2-ethylhexyl (meth)acrylate.

In particular, acrylic resins are preferable that have a hydrophilic unit derived from (meth)acrylic acid and a hydrophobic unit derived from at least one of α,β-ethylenically unsaturated compounds having an aryl group and ester compounds of α,β-unsaturated carboxylic acids. Especially, acrylic resins are preferable that have a hydrophilic unit derived from (meth)acrylic acid and a hydrophobic unit derived from at least one monomer of styrene and α-methylstyrene. These acrylic resins are likely to interact with the pigment, and are therefore suitable as a resin dispersant for dispersing the pigment in an aqueous medium.

Urethane resins can be obtained by, for example, allowing polyisocyanates to react with polyols. In addition, they may further react with a chain extender. Examples of olefin resins may include polyethylene and polypropylene.

[Aqueous Medium]

The ink is an aqueous ink that contains at least water as an aqueous medium. The ink can contain water or an aqueous medium, which is a mixed solvent of water and a water-soluble organic solvent. The ink preferably contains a water-soluble organic solvent. As the water, it is preferable to use deionized water or ion exchanged water. The content (% by mass) of water in the ink is preferably 50.0% by mass or more to 95.0% by mass or less based on the entire mass of the ink. As the water-soluble organic solvent, any of those that can be used for inks for ink jet, such as alcohols, glycols, glycol ethers, and nitrogen-containing compounds can be used. The content (% by mass) of the water-soluble organic solvent in the ink is preferably 3.0% by mass or more to 50.0% by mass or less, and still more preferably 10.0% by mass or more to 30.0% by mass or less, based on the entire mass of the ink. In particular, the content is preferably 15.0% by mass or more to 25.0% by mass or less.

[Surfactant]

The ink preferably further contains a surfactant. Examples of the surfactant may include anionic surfactants, cationic surfactants, and nonionic surfactants. In particular, it is preferable to use nonionic surfactants such as acetylene glycol surfactants and polyoxyethylene alkyl ethers. The content (% by mass) of the surfactant in the ink is preferably 0.1% by mass or more to 5.0% by mass or less, and still more preferably 0.1% by mass or more to 2.0% by mass or less, based on the entire mass of the ink.

[Other Components]

The ink may further contain various additives such as a defoaming agent, a pH adjuster, a viscosity adjuster, a corrosion inhibitor, a preservative, a mold inhibitor, an antioxidant, and a reduction inhibitor, if necessary.

[Physical Properties of Ink]

The ink is an aqueous ink that is applied to the ink jet system. Accordingly, from the viewpoint of reliability, it is preferable to properly control the physical property values thereof. Specifically, the surface tension of the ink at 25° C. is preferably 20 mN/m or more to 60 mN/m or less. Also, the viscosity of the ink at 25° C. is preferably 1.0 mPa·s or more to 10.0 mPa·s or less. The pH of the ink at 25° C. is preferably 7.0 or more to 9.5 or less, and still more preferably 8.0 or more to 9.5 or less.

The surface tension $\gamma_1$ (mN/m) of the black ink and the surface tension $\gamma_2$ (mN/m) of the color ink preferably satisfy the relationship of the following expression (5). This enhances the penetrability of the color ink into the recording medium, making it more difficult for the color ink to bleed into the black ink and further suppressing the decrease in optical density at the edge of the black image.

$$\gamma_1 > \gamma_2. \quad (5)$$

Unless above expression (5) is satisfied, the effectiveness of suppressing the decrease in optical density at the edge of the black image may be slightly decreased, both at the initial stage of recording and after recording over a long period of time. In particular, after recording over a long period of time, the effectiveness of suppressing the decrease in optical density may be more likely to be decreased. The surface tension of the ink is the "static surface tension" as measured according to principles such as the Wilhelmy method (plate method).

EXAMPLES

Hereinafter, the present invention will be described in further detail with reference to Examples and Comparative Examples, but the present invention is not limited in any way by the following Examples, as long as they do not exceed the gist thereof. Unless otherwise noted, the descriptions "parts" and "%" for component amounts are on a mass basis.

<Methods for Measuring Physical Property Values>

(Amount of Anionic Group)

The amounts of the anionic group in the pigment and in the resin particle were both measured using an automatic potentiometric titrator equipped with a flow potential titration unit (trade name "PCD-500", manufactured by Kyoto Electronics Manufacturing Co., Ltd.). Specifically, the amounts of the anionic group were each measured by potentiometric titration using 5 mmol/L methylglycol chitosan as the titrant reagent. As the automatic potentiometric titrator, the trade name "AT-510" (manufactured by Kyoto Electronics Manufacturing Co., Ltd.) was used.

(Average Particle Diameter (Cumulative 50% Particle Diameter (D50) in Volume-Based Particle Size Distribution))

The average particle diameter (cumulative 50% particle diameter (D50) in the volume-based particle size distribution) of the carbon black, organic pigment and resin particle was measured as follows. Liquids containing the samples were diluted with pure water to obtain measurement samples whose sample content was adjusted to about 1.0%. Then, the particle diameter (D50) of the particles in the measurement samples was measured using a particle size measuring apparatus. The measurement conditions at this time are shown below. As the particle size measuring apparatus, a particle size analyzer based on the dynamic light scattering method (trade name "Nanotrac WAVE II-Q", manufactured by MicrotracBEL Corp.) was used.

[Measurement Conditions]

SetZero: 30 seconds
Number of measurements: 3 times
Measurement time: 180 seconds
Shape: non-spherical (carbon black and organic pigment), true spherical (resin particle)
Refractive index: 1.80 (carbon black), 1.51 (organic pigment), 1.59 (resin particle)
Density: 1.0

(Surface Tension)

The static surface tension of the ink was measured using an automatic surface tensiometer utilizing the Wilhelmy method (trade name "DY-300", manufactured by Kyowa Interface Science Co., Ltd).

<Preparation of Pigment Dispersion Liquids>

(Pigment Dispersion Liquids 1 to 11 and 13)

A solution in which 5.0 g of concentrated hydrochloric acid was dissolved in 5.5 g of water was allowed to be cooled to 5° C., and 4-aminophthalic acid was added in the amount (g) shown in Table 1. The vessel in which this solution was placed was placed in an ice bath, and while stirring the solution and maintaining its temperature at 10° C. or lower, a solution obtained by dissolving 1.8 g of sodium nitrite in 9.0 g of ion exchanged water at 5° C. was added. After stirring for 15 minutes, 6.0 g of a carbon black with the characteristics (BET specific surface area and DBP oil absorption) shown in Table 1 was added under stirring, and the mixture was further stirred for 15 minutes to obtain a slurry. For pigment dispersion liquids 2 and 3, the average particle diameter (D50) of the pigment was adjusted by controlling the stirring time. The resulting slurry was filtered through filter paper (trade name "Standard Filter Paper No. 2", manufactured by ADVANTEC CO., LTD.), the particle was thoroughly washed with water, and dried in an oven at 110° C. Thereafter, sodium ion was replaced with potassium ion by the ion exchange method to obtain a self-dispersible pigment having —$C_6H_3$—$(COOK)_2$ group bonded to the particle surface of the carbon black. The content of the pigment was adjusted by adding an appropriate amount of water to obtain pigment dispersion liquids 1 to 11 and 13 in which the content of the pigment was 15.0%.

(Pigment Dispersion Liquids 12, 14 to 16, and 18 to 21)

A styrene-acrylic acid copolymer with an acid number of 90 mgKOH/g and a weight average molecular weight of 10,000 was neutralized with a 10% aqueous potassium hydroxide solution to prepare an aqueous solution of the resin dispersant. By mixing 15.0 parts of the pigment of the type shown in Table 1, the resin dispersant in the amount (parts) shown in Table 1, and the remainder of ion exchanged water that makes the total amount of the components 100.0 parts, a mixture was obtained. The resulting mixture was dispersed using a sand grinder for 1 hour, then processed by centrifugation to remove coarse particles. For pigment dispersion liquids 18 to 21, the average particle diameter (D50) of the pigment was adjusted by controlling the dispersion time. Furthermore, pressure filtration through a microfilter (manufactured by Fujifilm Corporation) with a pore size of 3.0 μm was performed to obtain pigment dispersion liquids 12, 14 to 16, and 18 to 21 containing the pigment dispersed by the resin dispersant. The content of the pigment and the content of the resin dispersant in the pigment dispersion liquids 12, 14 to 16, and 18 to 21 were 15.0% and 4.5%, respectively.

(Pigment Dispersion Liquid 17)

A commercially available pigment dispersion liquid containing a self-dispersible pigment (trade name "CAB-O-JET470Y", manufactured by Cabot Corporation, content of pigment 15.0%) was used as a pigment dispersion liquid 17. The self-dispersible pigment in the pigment dispersion liquid 17 is an organic pigment (C.I. Pigment Yellow 74) having an atomic group containing an anionic group bonded to the particle surface thereof.

TABLE 1

Preparation conditions and characteristics of pigment dispersion liquids 1 to 21

| | Preparation conditions | | | | | Characteristics | | | | |
|---|---|---|---|---|---|---|---|---|---|---|
| Pigment dispersion liquid | 4-Amino-phthalic acid (g) | Resin dispersant (parts) | Pigment type | BET specific surface area ($m^2$/g) | DBP oil absorption (100 mL/100 g) | Dispersion method | Content of pigment (%) | Content of resin (%) | Amount of anionic group $A_{P1}$ (mmol/g) | D50 (nm) |
| 1 | 0.73 | | Carbon black | 220 | 100 | Self-dispersible | 15.0 | | 0.20 | 120 |
| 2 | 0.73 | | Carbon black | 220 | 100 | Self-dispersible | 15.0 | | 0.20 | 160 |
| 3 | 0.73 | | Carbon black | 220 | 100 | Self-dispersible | 15.0 | | 0.20 | 95 |
| 4 | 0.55 | | Carbon black | 220 | 100 | Self-dispersible | 15.0 | | 0.15 | 120 |
| 5 | 0.59 | | Carbon black | 220 | 100 | Self-dispersible | 15.0 | | 0.16 | 120 |
| 6 | 2.92 | | Carbon black | 220 | 100 | Self-dispersible | 15.0 | | 0.80 | 120 |
| 7 | 3.00 | | Carbon black | 220 | 100 | Self-dispersible | 15.0 | | 0.82 | 120 |
| 8 | 0.73 | | Carbon black | 350 | 100 | Self-dispersible | 15.0 | | 0.20 | 120 |
| 9 | 0.73 | | Carbon black | 360 | 100 | Self-dispersible | 15.0 | | 0.20 | 120 |
| 10 | 0.73 | | Carbon black | 220 | 180 | Self-dispersible | 15.0 | | 0.20 | 120 |
| 11 | 0.73 | | Carbon black | 220 | 190 | Self-dispersible | 15.0 | | 0.20 | 120 |
| 12 | | 3.0 | Carbon black | 220 | 100 | Resin-dispersed | 15.0 | 3.0 | 0.20 | 120 |
| 13 | 0.55 | | Carbon black | 360 | 190 | Self-dispersible | 15.0 | | 0.15 | 120 |
| 14 | | 4.5 | C.I. Pigment Yellow 74 | — | — | Resin-dispersed | 15.0 | 4.5 | 0.60 | 150 |
| 15 | | 4.5 | C.I. Pigment Red 122 | — | — | Resin-dispersed | 15.0 | 4.5 | 0.60 | 150 |
| 16 | | 4.5 | C.I. Pigment Blue 15:3 | — | — | Resin-dispersed | 15.0 | 4.5 | 0.60 | 150 |
| 17 | | | C.I. Pigment Yellow 74 | — | — | Self-dispersible | 15.0 | | 0.60 | 165 |
| 18 | | 4.5 | C.I. Pigment Yellow 74 | — | — | Resin-dispersed | 15.0 | 4.5 | 0.60 | 110 |
| 19 | | 4.5 | C.I. Pigment Yellow 74 | — | — | Resin-dispersed | 15.0 | 4.5 | 0.60 | 125 |
| 20 | | 4.5 | C.I. Pigment Yellow 74 | — | — | Resin-dispersed | 15.0 | 4.5 | 0.60 | 175 |
| 21 | | 4.5 | C.I. Pigment Yellow 74 | — | — | Resin-dispersed | 15.0 | 4.5 | 0.60 | 185 |

<Synthesis of Resin Particles>

(Resin Particles 1 to 9)

In a four-necked flask equipped with a stirrer, a reflux condenser and a nitrogen gas introduction tube, potassium persulfate and ion exchanged water in the amounts shown in Table 2 were placed, and nitrogen gas was introduced. Also, monomers of the types and amounts shown in Table 2 were mixed to obtain a mixture. The resulting mixture was added dropwise into the four-necked flask under stirring over 1 hour, and then allowed to react at 80° C. for 2 hours. For resin particles 3, 4 and 7, the average particle diameter ($D50_{R1}$) of the resin particle was adjusted by controlling the drop time. After cooling the contents to room temperature, potassium hydroxide and an appropriate amount of ion exchanged water were added to adjust the pH to 8.5, yielding an aqueous dispersion liquid of the resin particle in which the content of the resin particle was 15.0%. The abbreviations in Table 2 have the meanings given below.

BMA: n-butyl methacrylate

EMA: ethyl methacrylate

St: styrene

MAA: methacrylic acid
EGdMA: ethylene glycol dimethacrylate
Aqualon KH-05: trade name of reactive surfactant (manufactured by DKS Co., Ltd.)

TABLE 2

Synthesis conditions and characteristics of resin particles

| Resin particle | Synthesis conditions: Potassium persulfate (parts) | Ion exchanged water (parts) | Monomer (parts): BMA | EMA | St | MAA | EGdMA | Aqualon KH-05 | Characteristics: Amount of anionic group $A_{R1}$ (mmol/g) | $D50_{R1}$ (nm) |
|---|---|---|---|---|---|---|---|---|---|---|
| 1 | 0.20 | 80.16 | 15.80 | | | 0.54 | 3.00 | 0.30 | 0.12 | 180 |
| 2 | 0.20 | 80.16 | | 15.80 | | 0.54 | 3.00 | 0.30 | 0.12 | 180 |
| 3 | 0.20 | 80.16 | | | 15.80 | 0.54 | 3.00 | 0.30 | 0.12 | 180 |
| 4 | 0.20 | 79.76 | 19.20 | | | 0.54 | | 0.30 | 0.12 | 180 |
| 5 | 0.20 | 80.16 | 15.80 | | | 0.54 | 3.00 | 0.30 | 0.12 | 90 |
| 6 | 0.20 | 80.16 | 15.80 | | | 0.54 | 3.00 | 0.30 | 0.12 | 120 |
| 7 | 0.20 | 79.04 | 16.70 | | | 0.76 | 3.00 | 0.30 | 0.18 | 180 |
| 8 | 0.20 | 78.60 | 16.70 | | | 1.20 | 3.00 | 0.30 | 0.22 | 180 |
| 9 | 0.20 | 81.06 | 14.70 | | | 0.74 | 3.00 | 0.30 | 0.18 | 90 |

(Resin Particle 10)

A urethane resin particle was synthesized according to the description of "Preparation of polycarbonate-modified urethane resin emulsion A" in Japanese Patent Application Laid-Open No. 2016-147984. A reaction vessel equipped with a stirrer, a reflux condenser and a thermometer was prepared. To this, 1,500 g of polycarbonate diol, 220 g of dimethylolpropionic acid, and 1,347 g of a solvent (dipropylene glycol dimethyl ether) were added, and the mixture was heated to 60° C. under a nitrogen atmosphere to dissolve the components. As the polycarbonate diol, a reaction product between 1,6-hexanediol and dimethyl carbonate was used. Furthermore, 1,445 g of 4,4'-dicyclohexylmethane diisocyanate and 2.6 g of dibutyltin dilaurylate were added, and the mixture was heated to 90° C. to perform a urethanization reaction over 5 hours, synthesizing an isocyanate-terminated urethane prepolymer. This was cooled to 80° C., 149 g of triethylamine was added, and the mixture was stirred, 4,340 g of which was taken out. The mixture taken out was added to a mixed solution of 5,400 g of water and 15 g of triethylamine while stirring vigorously. Subsequently, 1,500 g of ice was added and 626 g of a 35% aqueous solution of 2-methyl-1,5-pentanediamine was added to perform a chain extension reaction. Thereafter, the solvent was distilled off and an appropriate amount of water was added to obtain an aqueous dispersion of a resin particle 10 (resin particle formed of the polycarbonate-modified urethane resin) in which the content of the resin particle was 15.0%.

<Preparation of Inks>

The components (unit: %) shown in Tables 3-1, 3-2 and 4 were mixed, thoroughly stirred, and then subjected to pressure filtration through a polypropylene filter (manufactured by Pall Corporation) with a pore size of 2.5 μm, thereby preparing the respective inks

TABLE 3-1

Composition and characteristics of black inks

| | Black ink: K1 | K2 | K3 | K4 | K5 | K6 | K7 | K8 | K9 | K10 | K11 | K12 | K13 | K14 | K15 |
|---|---|---|---|---|---|---|---|---|---|---|---|---|---|---|---|
| Type of pigment dispersion liquid | 1 | 1 | 1 | 1 | 1 | 1 | 1 | 1 | 1 | 1 | 2 | 1 | 3 | 4 | 5 |
| Type of resin particle | 1 | 1 | 2 | 3 | 4 | 1 | 1 | 1 | 1 | 1 | 1 | 5 | 6 | 1 | 1 |
| Pigment dispersion liquid | 26.6 | 20.0 | 26.6 | 26.6 | 26.6 | 26.6 | 26.6 | 26.6 | 26.6 | 26.6 | 26.6 | 26.6 | 26.6 | 26.6 | 26.6 |
| Aqueous dispersion liquid of resin particle | 13.3 | 3.3 | 13.3 | 13.3 | 13.3 | 13.3 | 3.3 | 5.3 | 33.3 | 36.0 | 13.3 | 13.3 | 13.3 | 13.3 | 13.3 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Polyethylene glycol 1000 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Acrylic resin aqueous solution | | | | | | 3.3 | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Ion exchanged water | 39.4 | 56.0 | 39.4 | 39.4 | 39.4 | 36.1 | 49.4 | 47.4 | 19.4 | 16.7 | 39.4 | 39.4 | 39.4 | 39.4 | 39.4 |
| Surface tension $\gamma_1$ (mN/m) | 37 | 37 | 37 | 37 | 37 | 37 | 37 | 37 | 37 | 37 | 37 | 37 | 37 | 37 | 37 |
| Content of carbon black $P_1$ (%) | 4.0 | 3.0 | 4.0 | 4.0 | 4.0 | 4.0 | 4.0 | 4.0 | 4.0 | 4.0 | 4.0 | 4.0 | 4.0 | 4.0 | 4.0 |
| Content of acrylic resin particle $R_1$ (%) | 2.0 | 0.5 | 2.0 | 2.0 | 2.0 | 2.0 | 0.5 | 0.8 | 5.0 | 5.4 | 2.0 | 2.0 | 2.0 | 2.0 | 2.0 |
| Value of $R_1/P_1$ (times) | 0.5 | 0.2 | 0.5 | 0.5 | 0.5 | 0.5 | 0.1 | 0.2 | 1.3 | 1.4 | 0.5 | 0.5 | 0.5 | 0.5 | 0.5 |
| $D50_{P1}$ of carbon black (nm) | 120 | 120 | 120 | 120 | 120 | 120 | 120 | 120 | 120 | 120 | 160 | 120 | 95 | 120 | 120 |
| $D50_{R1}$ of acrylic resin particle (nm) | 180 | 180 | 180 | 180 | 180 | 180 | 180 | 180 | 180 | 180 | 180 | 90 | 120 | 180 | 180 |
| Amount of anionic group in carbon black $A_{P1}$ (mmol/g) | 0.20 | 0.20 | 0.20 | 0.20 | 0.20 | 0.20 | 0.20 | 0.20 | 0.20 | 0.20 | 0.20 | 0.20 | 0.20 | 0.15 | 0.16 |
| Amount of anionic group in acrylic resin particle $A_{R1}$ (mmol/g) | 0.12 | 0.12 | 0.12 | 0.12 | 0.12 | 0.12 | 0.12 | 0.12 | 0.12 | 0.12 | 0.12 | 0.12 | 0.12 | 0.12 | 0.12 |

TABLE 3-1-continued

| Composition and characteristics of black inks | | | | | | | | | | | | | | | |
|---|---|---|---|---|---|---|---|---|---|---|---|---|---|---|---|
| | Black ink | | | | | | | | | | | | | | |
| | K1 | K2 | K3 | K4 | K5 | K6 | K7 | K8 | K9 | K10 | K11 | K12 | K13 | K14 | K15 |
| BET specific surface area of carbon black ($m^2/g$) | 220 | 220 | 220 | 220 | 220 | 220 | 220 | 220 | 220 | 220 | 220 | 220 | 220 | 220 | 220 |
| DBP oil absorption of carbon black (100 mL/100 g) | 100 | 100 | 100 | 100 | 100 | 100 | 100 | 100 | 100 | 100 | 100 | 100 | 100 | 100 | 100 |

TABLE 3-2

| Composition and characteristics of black inks | | | | | | | | | | | | | | |
|---|---|---|---|---|---|---|---|---|---|---|---|---|---|---|
| | Black ink | | | | | | | | | | | | | |
| | K16 | K17 | K18 | K19 | K20 | K21 | K22 | K23 | K24 | K25 | K26 | K27 | K28 | K29 |
| Type of pigment dispersion liquid | 6 | 7 | 1 | 1 | 8 | 9 | 10 | 11 | 12 | 1 | 13 | 1 | 13 | 13 |
| Type of resin particle | 1 | 1 | 7 | 8 | 1 | 1 | 1 | 1 | 1 | 1 | 9 | — | 10 | 110 |
| Pigment dispersion liquid | 26.6 | 26.6 | 26.6 | 26.6 | 26.6 | 26.6 | 26.6 | 26.6 | 26.6 | 26.6 | 26.6 | 26.6 | 26.6 | 20.0 |
| Aqueous dispersion liquid of resin particle | 13.3 | 13.3 | 13.3 | 13.3 | 13.3 | 13.3 | 13.3 | 13.3 | 13.3 | 13.3 | 3.3 | 0.0 | 13.3 | 13.3<br>13.3 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 |
| Polyethylene glycol 1000 | 0.5 | 0.5 | 0.5 | 0.5 | 0.5 | 0.5 | 0.5 | 0.5 | 0.5 | 0.5 | 0.5 | 0.5 | 0.5 | 0.5 |
| Acrylic resin aqueous solution | | | | | | | | | | | | | | |
| Acetylenol E100 | 0.2 | 0.2 | 0.2 | 0.2 | 0.2 | 0.2 | 0.2 | 0.2 | 0.2 | 1.0 | 1.0 | 0.2 | 0.2 | 1.0 |
| Ion exchanged water | 39.4 | 39.4 | 39.4 | 39.4 | 39.4 | 39.4 | 39.4 | 39.4 | 39.4 | 38.6 | 48.6 | 52.7 | 39.4 | 31.9 |
| Surface tension $\gamma_1$ (mN/m) | 37 | 37 | 37 | 37 | 37 | 37 | 37 | 37 | 37 | 34 | 34 | 37 | 37 | 34 |
| Content of carbon black $P_1$ (%) | 4.0 | 4.0 | 4.0 | 4.0 | 4.0 | 4.0 | 4.0 | 4.0 | 4.0 | 4.0 | 4.0 | 4.0 | 4.0 | 3.0 |
| Content of acrylic resin particle $R_1$ (%) | 2.0 | 2.0 | 2.0 | 2.0 | 2.0 | 2.0 | 2.0 | 2.0 | 2.0 | 2.0 | 0.5 | 0.0 | 0.0 | 2.0 |
| Value of $R_1/P_1$ (times) | 0.5 | 0.5 | 0.5 | 0.5 | 0.5 | 0.5 | 0.5 | 0.5 | 0.5 | 0.5 | 0.1 | 0.0 | 0.0 | 0.7 |
| $D50_{P1}$ of carbon black (nm) | 120 | 120 | 120 | 120 | 120 | 120 | 120 | 120 | 120 | 120 | 120 | 120 | 120 | 120 |
| $D50_{R1}$ of acrylic resin particle (nm) | 180 | 180 | 180 | 180 | 180 | 180 | 180 | 180 | 180 | 180 | 90 | — | — | 180 |
| Amount of anionic group in carbon black $A_{P1}$ (mmol/g) | 0.80 | 0.82 | 0.20 | 0.20 | 0.20 | 0.20 | 0.20 | 0.20 | 0.20 | 0.20 | 0.15 | 0.20 | 0.20 | 0.20 |
| Amount of anionic group in acrylic resin particle $A_{R1}$ (mmol/g) | 0.12 | 0.12 | 0.18 | 0.22 | 0.12 | 0.12 | 0.12 | 0.12 | 0.12 | 0.12 | 0.12 | — | — | 0.12 |
| BET specific surface area of carbon black ($m^2/g$) | 220 | 220 | 220 | 220 | 350 | 360 | 220 | 220 | 220 | 220 | 160 | 220 | 220 | 220 |
| DBP oil absorption of carbon black (100 mL/100 g) | 100 | 100 | 100 | 100 | 100 | 100 | 180 | 190 | 100 | 100 | 190 | 100 | 100 | 100 |

TABLE 4

| Composition and characteristics of color inks | | | | | | | | | | | | | |
|---|---|---|---|---|---|---|---|---|---|---|---|---|---|
| | Color ink | | | | | | | | | | | | |
| | C1 | C2 | C3 | C4 | C5 | C6 | C7 | C8 | C9 | C10 | C11 | C12 | C13 |
| Type of pigment dispersion liquid | 14 | 14 | 15 | 16 | 17 | 14 | 18 | 19 | 20 | 21 | 14 | 14 | 14 |
| Pigment dispersion liquid | 29.3 | 22.3 | 29.3 | 29.3 | 29.3 | 40.0 | 29.3 | 29.3 | 29.3 | 29.3 | 33.3 | 29.3 | 20.0 |
| Aqueous dispersion liquid of resin particle 1 | | | | | | | | | | | | 13.3 | |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 |
| Polyethylene glycol 1000 | 0.5 | 0.5 | 0.5 | 0.5 | 0.5 | 0.5 | 0.5 | 0.5 | 0.5 | 0.5 | 0.5 | 0.5 | 0.5 |

TABLE 4-continued

Composition and characteristics of color inks

| | Color ink | | | | | | | | | | | | |
|---|---|---|---|---|---|---|---|---|---|---|---|---|---|
| | C1 | C2 | C3 | C4 | C5 | C6 | C7 | C8 | C9 | C10 | C11 | C12 | C13 |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 |
| Ion exchanged water | 49.7 | 56.7 | 49.7 | 49.7 | 49.7 | 39.0 | 49.7 | 49.7 | 49.7 | 49.7 | 45.7 | 36.4 | 59.0 |
| Surface tension $\gamma_2$ (mN/m) | 35.0 | 35.0 | 35.0 | 35.0 | 35.0 | 35.0 | 35.0 | 35.0 | 35.0 | 35.0 | 35.0 | 35.0 | 35.0 |
| Content of organic pigment $P_2$ (%) | 4.4 | 3.3 | 4.4 | 4.4 | 4.4 | 6.0 | 4.4 | 4.4 | 4.4 | 4.4 | 5.0 | 4.4 | 3.0 |
| Content of acrylic resin particle $R_2$ (%) | 0.0 | 0.0 | 0.0 | 0.0 | 0.0 | 0.0 | 0.0 | 0.0 | 0.0 | 0.0 | 0.0 | 2.0 | 0.0 |
| D50p2 of organic pigment (nm) | 150 | 150 | 150 | 150 | 165 | 150 | 110 | 125 | 175 | 185 | 150 | 150 | 150 |
| Amount of anionic group in organic pigment $A_{P2}$ (mmol/g) | 0.60 | 0.60 | 0.60 | 0.60 | 0.60 | 0.60 | 0.60 | 0.60 | 0.60 | 0.60 | 0.60 | 0.60 | 0.60 |

<Preparation of Concentrated Inks>

The so-called continuous supply type ink jet recording apparatuses, which have a large capacity main tank (first ink storage portion) having an inlet port, have an advantage in that there is no need to replace the ink cartridge. On the other hand, the ink at the lower part of the main tank tends to be likely to decrease the quality of recorded images due to the increased content of the pigment resulting from settlement of the pigment. As previously mentioned, the color ink tends to stay longer in the first ink storage portion compared to the black ink. For this reason, the color ink was evaluated assuming that it would be used for a long period of time, after which the content of the pigment would have been increased compared to that of the black ink. Specifically, for the black ink, evaluation was performed using one obtained by evaporating the liquid component to concentrate the ink and increasing the contents of solids (pigment, resin dispersant and resin particle) by 20%, respectively, from the composition shown in Tables 3-1 and 3-2. Also, for the color ink, evaluation was performed using one obtained by evaporating the liquid component to concentrate the ink and increasing the contents of solids (pigment, resin dispersant and resin particle) by 30%, respectively, from the composition shown in Table 4.

<Ink Jet Recording Apparatus>

By using the trade name "PIXUS TS5130S" (manufactured by Canon Inc.) and modifying it to have the configurations shown in Table 5, apparatuses 1 to 3 were prepared.

The apparatus 1 has the configuration shown in FIG. 1 and is an ink jet recording apparatus of the type that refills the ink from the inlet port of the first ink storage portion when the remaining amount of ink is reduced. The maximum ink capacity of the first ink storage portion for the black ink is 100 mL, and the maximum ink capacity of the second ink storage portion is 30 mL. Also, the maximum ink capacity for the color ink is 58 mL, and the maximum ink capacity of the second ink storage portion is 10 mL.

The apparatus 2 is an ink jet recording apparatus of the type that has no first ink storage portion installed in the apparatus, and has an inlet port in the second ink storage portion on the carriage.

The apparatus 3 is an ink jet recording apparatus of the type that has a first ink storage portion (no inlet port) and a second ink storage portion, and the first ink storage portion is replaced when the remaining amount of ink is reduced.

TABLE 5

Type of ink jet recording apparatus

| Ink jet recording apparatus | First ink storage portion | Second ink storage portion | Connection between first ink storage portion and second ink storage portion |
|---|---|---|---|
| 1 | With inlet port | Present | Tube |
| 2 | — | With inlet port | — |
| 3 | No inlet port (ink cartridge form) | Present | Tube |

<Evaluation>

Using the apparatus, black ink and color ink of the types shown in Table 6, solid black and color images (3 cm×2 cm) were recorded adjacent to each other on a recording medium. The recording medium used was plain paper (trade name "CS-680", manufactured by Canon Inc.). The recording conditions for the solid images were as follows: about 22 ng of the black ink and about 11 ng of the color ink were each applied to a unit region of 1/600 inches×1/600 inches, and recording was performed under the conditions of a temperature of 25° C. and a relative humidity of 50%. After the recording, the solid images were placed in an environment with a temperature of 25° C. and a relative humidity of 50% for one day, and the evaluation shown below was performed. In the present invention, "AA", "A" and "B" are considered acceptable levels, and "C" is considered an unacceptable level, based on the evaluation criteria for each item shown below. The evaluation results are shown in Table 6. In Table 6, "YES" is given when the ink satisfies the "$P_2<(P_1+R_1)$" relationship, and "NO" when the ink does not. Also, "YES" is given when the ink satisfies the "$D50_{P1}<D50_{P2}<D50_{R1}$ relationship", and "NO" when the ink does not.

(Optical Density at Edge of Black Image (Initial))

Regions were extracted where the dynamic threshold based on measured values of the reflectance of the recording medium (Rmax) and the reflectance of the black image (Rmin) was 60% or less (region 1) and more than 60% to 90% or less (region 2). The extraction of the region 1 and region 2 was performed using the trade name "personal image quality evaluation system PIAS-II" (manufactured by QEA). Meanwhile, the recorded solid images were saved as an image data using an optical microscope (trade name "ZEISS SteREO Discovery V8", manufactured by ZEISS, magnification: 8 times, with scale). After loading the saved image data with image processing software (trade name "Adobe Photoshop CC", manufactured by Adobe Systems), the Bk density (%) at arbitrary 30 locations in each region was read using the dropper tool of the software, and the average value was calculated. The difference between the average value of Bk density (%) in the region 1 and the average value of Bk density (%) in the region 2 (Bk density difference (%)) was calculated, and the decrease in optical density at the edge of the black image was evaluated according to the evaluation criteria shown below.

AA: The Bk density difference was 8% or less.

A: The Bk density difference was more than 8% to 14% or less.

B: The Bk density difference was more than 14% to 20% or less.

C: The Bk density difference was more than 20%.

(Optical Density at Edge of Black Image (after Long Term Recording))

The optical density (after long term recording) at the edge of the black image was evaluated for the Examples and Comparative Examples using the apparatus 1 in the same manner as “Optical density at edge of black image (initial)” mentioned above, except that the concentrated inks were used. Note that the evaluation after long term recording was not performed for the apparatuses 2 and 3, since problems due to pigment settlement do not occur.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-092624, filed Jun. 5, 2023, and Japanese Patent Application No. 2024-071534, filed Apr. 25, 2024, which are hereby incorporated by reference herein in their entirety.

What is claimed is:

1. An ink jet recording method using an ink jet recording apparatus comprising:

a first ink storage portion that has an openable and closable ink inlet port and that is refillable with an aqueous ink from the ink inlet port;

a second ink storage portion that is connected to the first ink storage portion via a tube and that stores the aqueous ink; and a recording head that is connected to the second ink storage portion and that has an ejection orifice formed

TABLE 6

Evaluation conditions and evaluation results

| | | Evaluation conditions | | | | | Optical density at edge of black image | |
|---|---|---|---|---|---|---|---|---|
| | | Ink jet recording apparatus | Black ink | Color ink | $P_2 < (P_1 + R_1)$ relationship | $D50_{P1} < D50_{P2} < D50_{R1}$ relationship | Initial | After long term recording |
| Example | 1 | 1 | K1 | C1 | YES | YES | AA | AA |
| | 2 | 1 | K2 | C2 | YES | YES | AA | AA |
| | 3 | 1 | K3 | C1 | YES | YES | AA | AA |
| | 4 | 1 | K4 | C1 | YES | YES | AA | AA |
| | 5 | 1 | K5 | C1 | YES | YES | AA | AA |
| | 6 | 1 | K6 | C1 | YES | YES | AA | AA |
| | 7 | 1 | K1 | C3 | YES | YES | AA | AA |
| | 8 | 1 | K1 | C4 | YES | YES | AA | AA |
| | 9 | 1 | K1 | C5 | YES | YES | AA | AA |
| | 10 | 1 | K7 | C1 | YES | YES | A | A |
| | 11 | 1 | K8 | C1 | YES | YES | AA | AA |
| | 12 | 1 | K9 | C1 | YES | YES | AA | AA |
| | 13 | 1 | K10 | C1 | YES | YES | A | A |
| | 14 | 1 | K1 | C6 | NO | YES | A | A |
| | 15 | 1 | K11 | C1 | YES | NO | A | A |
| | 16 | 1 | K1 | C7 | YES | NO | A | A |
| | 17 | 1 | K1 | C8 | YES | YES | AA | AA |
| | 18 | 1 | K12 | C1 | YES | NO | A | A |
| | 19 | 1 | K13 | C1 | YES | NO | A | A |
| | 20 | 1 | K1 | C9 | YES | YES | AA | AA |
| | 21 | 1 | K1 | C10 | YES | NO | A | A |
| | 22 | 1 | K14 | C1 | YES | YES | AA | A |
| | 23 | 1 | K15 | C1 | YES | YES | AA | AA |
| | 24 | 1 | K16 | C1 | YES | YES | AA | AA |
| | 25 | 1 | K17 | C1 | YES | YES | A | A |
| | 26 | 1 | K18 | C1 | YES | YES | AA | AA |
| | 27 | 1 | K19 | C1 | YES | YES | A | A |
| | 28 | 1 | K20 | C1 | YES | YES | AA | AA |
| | 29 | 1 | K21 | C1 | YES | YES | A | B |
| | 30 | 1 | K22 | C1 | YES | YES | AA | AA |
| | 31 | 1 | K23 | C1 | YES | YES | A | B |
| | 32 | 1 | K24 | C1 | YES | YES | A | A |
| | 33 | 1 | K25 | C1 | YES | YES | A | B |
| | 34 | 1 | K26 | C11 | NO | NO | B | B |
| Comparative Example | 1 | 1 | K27 | C1 | NO | NO | C | C |
| | 2 | 1 | K28 | C1 | NO | YES | C | C |
| | 3 | 1 | K27 | C12 | NO | NO | C | C |
| Reference Example | 1 | 2 | K1 | C1 | YES | YES | AA | — |
| | 2 | 2 | K27 | C1 | NO | YES | AA | — |
| | 3 | 3 | K1 | C1 | YES | YES | AA | — |
| | 4 | 3 | K27 | C1 | NO | YES | AA | — |
| | 5 | 3 | K29 | C13 | YES | YES | AA | — |

to eject the aqueous ink supplied from the second ink storage portion, with the method comprising:

recording an image by applying the aqueous ink ejected from the ejection orifice to a recording medium, wherein the aqueous ink comprises a black ink containing a carbon black and an acrylic resin particle, and a color ink containing an organic pigment, wherein a content $P_1$ (% by mass) of the carbon black in the black ink and a content $P_2$ (% by mass) of the organic pigment in the color ink satisfy a relationship of the following expression (1):

$$P_1 \leq P_2, \tag{1}$$

and wherein the carbon black is a self-dispersible pigment having an anionic group bonded to a particle surface thereof directly or via another atomic group.

2. The ink jet recording method according to claim 1, wherein, in the black ink, a content $R_1$ (% by mass) of the acrylic resin particle is 0.2 times or more to 1.3 times or less the content $P_1$ (% by mass) of the carbon black in mass ratio.

3. The ink jet recording method according to claim 1, wherein the content $P_1$ (% by mass) of the carbon black in the black ink, a content $R_1$ (% by mass) of the acrylic resin particle in the black ink and the content $P_2$ (% by mass) of the organic pigment in the color ink satisfy a relationship of the following expression (2):

$$P_2 < (P_1 + R_1). \tag{2}$$

4. The ink jet recording method according to claim 1, wherein a cumulative 50% particle diameter $D50_{P1}$ (nm) in a volume-based particle size distribution of the carbon black, a cumulative 50% particle diameter $D50_{P2}$ (nm) in a volume-based particle size distribution of the organic pigment, and a cumulative 50% particle diameter $D50_{R1}$ (nm) in a volume-based particle size distribution of the acrylic resin particle satisfy a relationship of the following expression (3):

$$D50_{P1} < D50_{P2} < D50_{R1}. \tag{3}$$

5. The ink jet recording method according to claim 1, wherein an amount $A_{P1}$ (mmol/g) of an anionic group in the carbon black is 0.16 mmol/g or more to 0.80 mmol/g or less.

6. The ink jet recording method according to claim 1, wherein an amount $A_{R1}$ (mmol/g) of an anionic group in the acrylic resin particle and an amount $A_{P1}$ (mmol/g) of an anionic group in the carbon black satisfy a relationship of the following expression (4):

$$A_{R1} < A_{P1}. \tag{4}$$

7. The ink jet recording method according to claim 1, wherein the carbon black has a BET specific surface area of 350 $m^2/g$ or less.

8. The ink jet recording method according to claim 1, wherein a DBP oil absorption of the carbon black is 180 mL/100 g or less.

9. The ink jet recording method according to claim 1, wherein a surface tension $\gamma_1$ (mN/m) of the black ink and a surface tension $\gamma_2$ (mN/m) of the color ink satisfy a relationship of the following expression (5):

$$\gamma_1 > \gamma_2. \tag{5}$$

10. An ink jet recording apparatus comprising:

a first ink storage portion that has an openable and closable ink inlet port and that is refillable with an aqueous ink from the ink inlet port;

a second ink storage portion that is connected to the first ink storage portion via a tube and that stores the aqueous ink; and a recording head that is connected to the second ink storage portion and that has an ejection orifice formed to eject the aqueous ink supplied from the second ink storage portion, wherein the aqueous ink comprises a black ink containing a carbon black and an acrylic resin particle, and a color ink containing an organic pigment, wherein a content $P_1$ (% by mass) of the carbon black in the black ink and a content $P_2$ (% by mass) of the organic pigment in the color ink satisfy a relationship of the following expression (1):

$$P_1 \leq P_2, \tag{1}$$

and wherein the carbon black is a self-dispersible pigment having an anionic group bonded to a particle surface thereof directly or via another atomic group.

11. An ink jet recording method using an ink jet recording apparatus comprising:

a first ink storage portion that has an openable and closable ink inlet port and that is refillable with an aqueous ink from the ink inlet port;

a second ink storage portion that is connected to the first ink storage portion via a tube and that stores the aqueous ink; and a recording head that is connected to the second ink storage portion and that has an ejection orifice formed to eject the aqueous ink supplied from the second ink storage portion, with the method comprising:

recording an image by applying the aqueous ink ejected from the ejection orifice to a recording medium, wherein the aqueous ink comprises a black ink containing a carbon black and an acrylic resin particle, and a color ink containing an organic pigment, wherein a content $P_1$ (% by mass) of the carbon black in the black ink and a content $P_2$ (% by mass) of the organic pigment in the color ink satisfy a relationship of the following expression (1):

$$P_1 \leq P_2, \tag{1}$$

and wherein the content $P_1$ (% by mass) of the carbon black in the black ink, a content $R_1$ (% by mass) of the acrylic resin particle in the black ink, and the content $P_2$ (% by mass) of the organic pigment in the color ink satisfy a relationship of the following expression (2):

$$P_2 < (P_1 + R_1). \quad (2)$$

12. An ink jet recording method using an ink jet recording apparatus comprising:

a first ink storage portion that has an openable and closable ink inlet port and that is refillable with an aqueous ink from the ink inlet port;

a second ink storage portion that is connected to the first ink storage portion via a tube and that stores the aqueous ink; and a recording head that is connected to the second ink storage portion and that has an ejection orifice formed to eject the aqueous ink supplied from the second ink storage portion, with the method comprising:

recording an image by applying the aqueous ink ejected from the ejection orifice to a recording medium, wherein the aqueous ink comprises a black ink containing a carbon black and an acrylic resin particle, and a color ink containing an organic pigment, wherein a content $P_1$ (% by mass) of the carbon black in the black ink and a content $P_2$ (% by mass) of the organic pigment in the color ink satisfy a relationship of the following expression (1):

$$P_1 \leq P_2, \quad (1)$$

and wherein a surface tension $\gamma_1$ (mN/m) of the black ink and a surface tension $\gamma_2$ (mN/m) of the color ink satisfy a relationship of the following expression (5):

$$\gamma_1 > \gamma_2. \quad (5)$$

* * * * *